May 14, 1929.   D. G. DAWKINS ET AL   1,713,171
BELT OPERATED MOTOR CUT-OUT
Filed Jan. 18, 1928   2 Sheets-Sheet 1
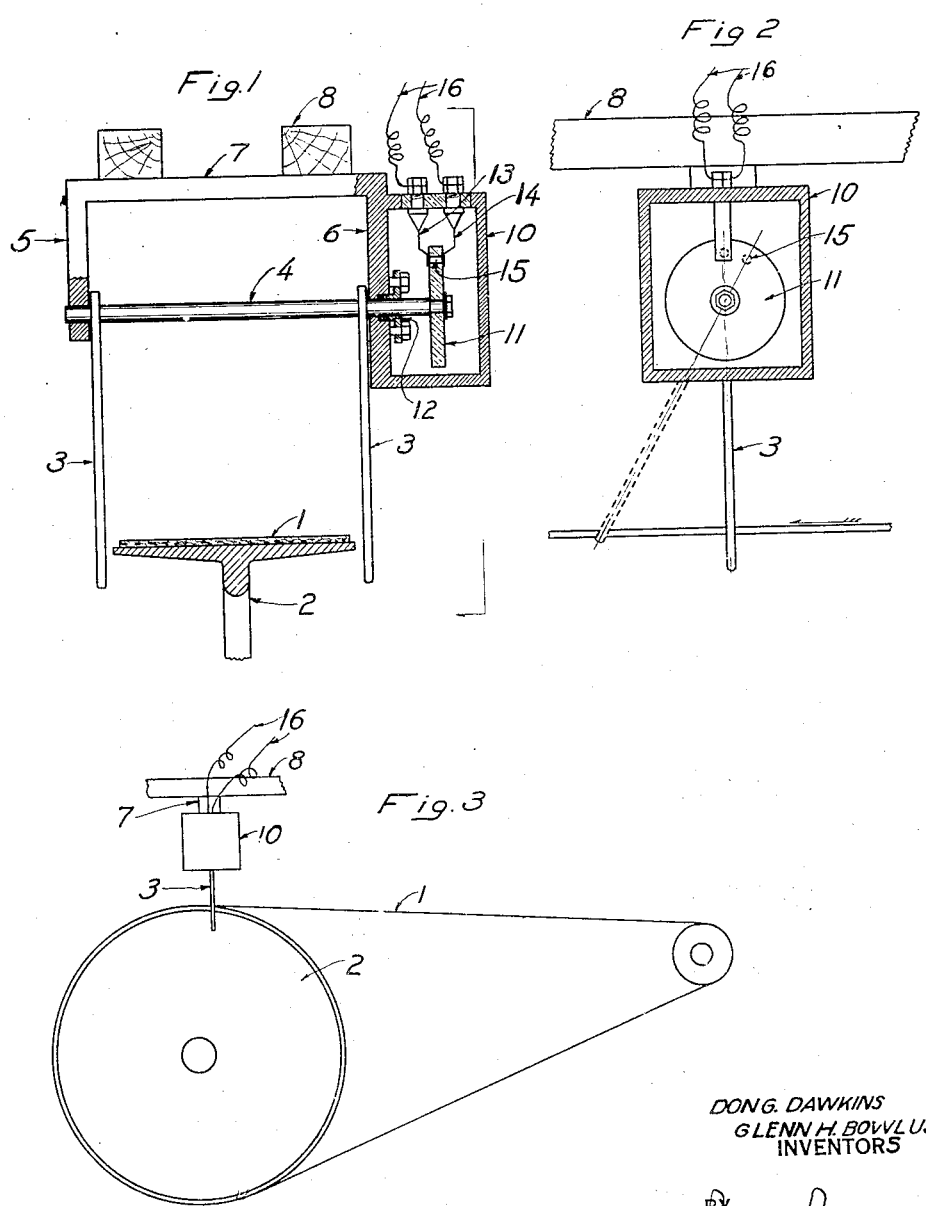
DON G. DAWKINS
GLENN H. BOWLUS
INVENTORS
ATTORNEY May 14, 1929.　　D. G. DAWKINS ET AL　　1,713,171
BELT OPERATED MOTOR CUT-OUT
Filed Jan. 18, 1928　　2 Sheets-Sheet 2

GLENN H. BOWLUS
DON G. DAWKINS
*INVENTORS*

BY *Paul W. Prutzman*
*ATTORNEYS.*

Patented May 14, 1929.

UNITED STATES PATENT OFFICE.

DON G. DAWKINS AND GLENN H. BOWLUS, OF LOS ANGELES, CALIFORNIA.

BELT-OPERATED MOTOR CUT-OUT.

Application filed January 18, 1928. Serial No. 247,615.

Our invention relates to safety devices and in particular to a device that will prevent operation of a belt on which the alignment is faulty and which, therefore, tends to run with part of the belt overhanging the edge of the pulley. Such condition of operation not only reduces the effective width of the belt but also produces unequal strain in adjacent parts of the belt and also may cause fraying of the edge due to rubbing against the bearing pedestal or other adjacent parts.

Our invention is particularly applicable to installations of a temporary nature in which, due to lightness of foundations, alignment of the belt is apt to be changed by the shifting of the foundation. It will then be necessary for mechanics to realign the belt by adjustment of the positions of the pulleys and until this is done the device will frustrate any attempt to operate the belt in its condition of misalignment.

In our belt operated motor cutout we arrange two triggers so that the belt as it starts off the pulleys strikes either one of them. The motion imparted to the trigger we utilize to open or close the electric circuit energizing or de-energizing the low-voltage release thru which the motor is operated.

We attain these objects by the mechanism illustrated in the accompanying drawing in which Fig. 1 is an elevation of a preferred embodiment of our present invention, showing it mounted over the belt.

Fig. 2 is an elevation of Fig. 1, partly in section.

Fig. 3 shows a preferred location of our present invention with relation to the belt pulleys.

Figure 4:
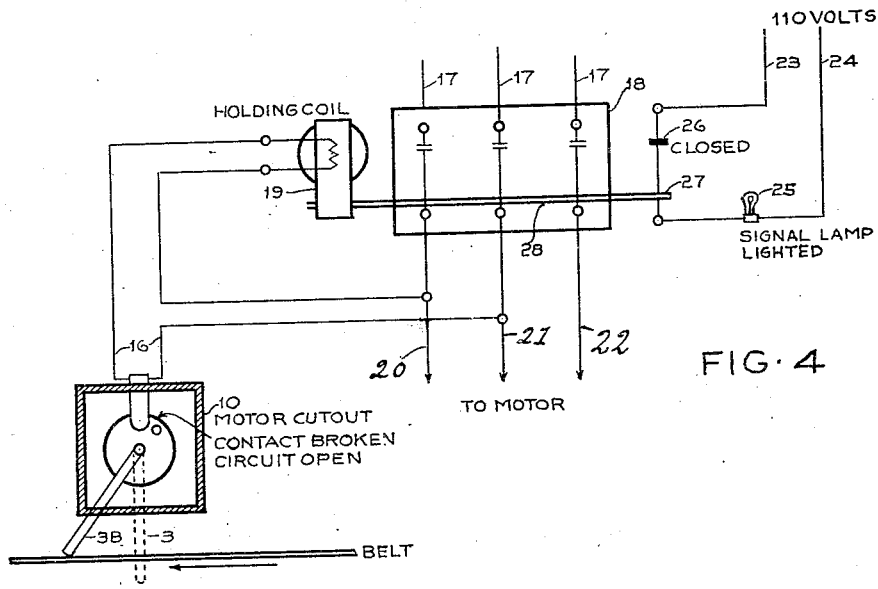
Fig. 4 shows a preferred manner in which our motor cutout may be electrically connected.

Referring to the drawing, Figs. 1, 2 and 3, a belt is indicated at 1 running on a pulley 2. The triggers 3 consist of small steel rods of a size suitable to the belt on which they work. These triggers are secured to a common shaft 4 which is adapted to rotate in bearings formed in the legs 5 and 6 of the frame 7. The triggers ordinarily hang vertical about an inch away from the edge of the belt, this of course depending on the size of the belt. The frame 7 is secured to a suitable support 8 to hold it rigidly in place over the belt. On leg 6 a vapor proof box 10 is provided. Shaft 4 passes thru leg 6 into this vapor proof box and carries a disc 11 made of bakelite, fiber or other suitable insulating material. A stuffing box 12 surrounds shaft 4 where it enters the box 10. Within box 10 two brushes 13 and 14 are arranged to contact with the flat radial faces of the disc 11, the points of contact of the brushes being directly opposite each other through the disc. A pin 15 passes through the disc and is so located that a circuit is completed through the brushes and pin when the triggers hang in their normal vertical position. The brushes are secured in a non-conducting material in the vapor proof box with the terminal posts extending through the box. Wire leads 16 one from each brush lead to the low-voltage release coil. The low-voltage release must be connected in series with the brushes in our belt operated motor cutout.

A preferred manner of electrically connecting our device is shown in Fig. 4, in which 17—17—17 are the usual power line connections, 18 is a manually operated starter, such as is commonly used on squirrel cage induction motors, equipped with a low-voltage release attachment 19. From the starter 18 the connections 20 and 21 are made to the cutout 10 (detailed in Fig. 1) and to the holding coil of the low-voltage release 19 as shown. Connections 20, 21 and 22 are made to the motor. A separate 110 volt circuit 23—24 is connected to the signal lamp 25 through a switch 26 and circuit breaker 27, which are connected to an extension of the motor starter armature 28. In the hookup here illustrated these connections are made in such manner that when the switch is closed and the armature held up by the coil, the motor then being in operation, the lamp circuit is open and the signal lamp extinguished, while the cutting out of the motor by the release of the armature will simultaneously close the lamp circuit and light the lamp. If in place of a holding coil, such as illustrated, a trip coil is used, the connections to the lamp circuit should be made in such manner that this circuit will be closed and the lamp lighted when the armature is drawn up by the trip coil.

In operation, when the belt starts to run off the pulley, it strikes one of the triggers and causes it to swing (Fig. 2). The motion rotates the disc and moves the pin from between the brushes, consequently opening the circuit holding shut the switch in the low-voltage release, and the motor is thus stopped before the belt has done any damage. The momentum of the moving pulley is usually sufficient to recenter the belt on the pulleys.

It is to be noted that the belt is not held on the pulley by the physical action of the triggers restraining it from running off. Rather the triggers stop the power input to the belt and, when slipping is due to overload the tendency to slip ceases when the torque of the motor is withdrawn. The belt may in such case recenter itself, or it may remain in the position at which it engaged the trigger, or it may even come off entirely, but in any case the belt is no longer being driven by the motor and the damage which such driving of the belt might cause is obviated.

Our present invention as illustrated is for use on belts running practically horizontal. By adding a balance weight and a lever adjustably secured to shaft 4 the normal position of the triggers can be varied to any desired amount. By this simple addition the triggers can be caused to rest at any angle, the desired position being nearly perpendicular of the belt. This principle can be extended to belts running on pulleys whose axis is vertical.

Figure 5:
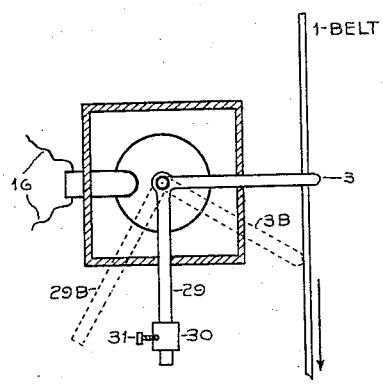
Fig. 5 illustrates an adaptation of our invention to the protection of vertical belts.
Figure 6:
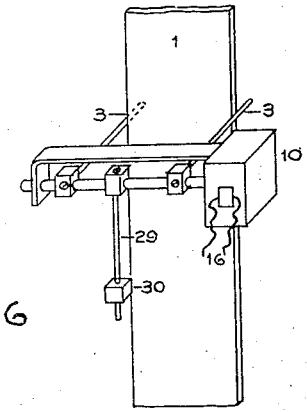
Fig. 6 is an isometric view of the device illustrated in the preceding figure.

This modification is illustrated in Figs. 5 and 6 in which 1 indicates a short section of the belt running vertically downward, 10 is the cutout proper as detailed in Fig. 2, 3 indicates one of the triggers in its normal position and the dotted lines 3ᴮ the position into which it is thrown by contact with the edge of the belt, 29 is an arm rigidly affixed to one of the triggers and at approximately a right angle thereto, and 30 is a removable weight sliding on the arm and adjustably affixed thereto by a set screw indicated at 31. This removable and adjustable weight should be just sufficient to maintain the triggers 3 in the extended horizontal position shown, but not sufficient to prevent them from being carried down to the position 3ᴮ when engaged by the edge of the belt. As in the previous description, when the trigger is brought to such depressed position the switch 11—15 located within the cutout 10 is opened and the motor circuit broken by the action of whatever type of relay or low-voltage release may be placed in circuit with the cutout.

Our device, as said, may be connected in series with a low-voltage release or other form of holding coil, in which case the cutout will be required to open the circuit of the coil. In place of a holding coil certain devices may be used, known generally as trip coils, which require the energizing of the coil in order to disconnect the motor and in this case our device may be used to close the circuit when misalignment of the belt occurs, simply by adjusting the rods with reference to the moving contact. This requires a revolution of the disc 11 on the shaft 4 to such position that the pin 15 is out of contact with the brushes 13 and 14 when the triggers are in the position indicated at 3, and in contact with the brushes when the trigger is brought to the position indicated by the dotted lines 3ᴮ.

As our present invention is vapor proof, it is suited for installations where fire hazard is present in the form of inflammable vapors. Our belt operated motor cutout can be placed any place along the belt but it is preferable to locate it over the pulley from which the belt is most likely to run off. This can be determined only by the operator.

We claim as our invention:

1. In combination with a belt running on pulleys and driven by an electric motor, said motor furnished with an electrically operated switch in its supply circuit, a device for automatically stopping said motor comprising: a pair of parallel triggers rigidly secured to a shaft and extending on each side past the edges of said belt, means for supporting said shaft, and a rotary switch actuated by said shaft for controlling the circuit through which flows the electric energy which actuates said electrically operated switch.

2. In combination with a belt running on pulleys and driven by an electric motor: a pair of parallel triggers extending on each side of said belt and past its edges; means for pivotally supporting said triggers, an electrical circuit breaker operated by a low-voltage release, and means actuated by said triggers for actuating said release and thus stopping the flow of electricity to said motor should said belt strike either of said triggers while running.

In witness that we claim the foregoing we have hereunto subscribed our names this 14th day of January, 1928.

DON G. DAWKINS.
GLENN H. BOWLUS.